April 3, 1934.  J. A. MacLEAN  1,953,305
BOLT
Original Filed Aug. 1, 1930  2 Sheets-Sheet 1
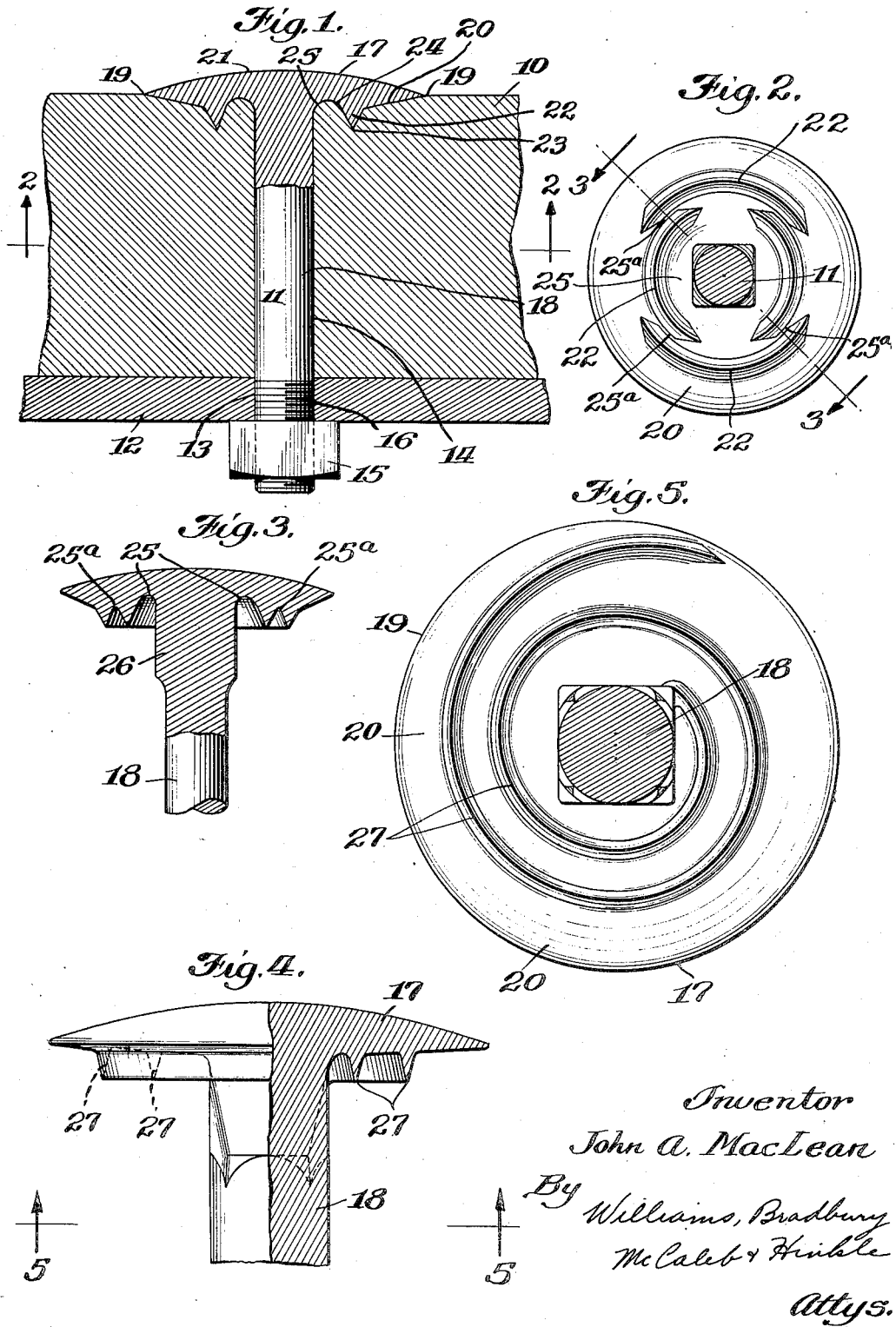

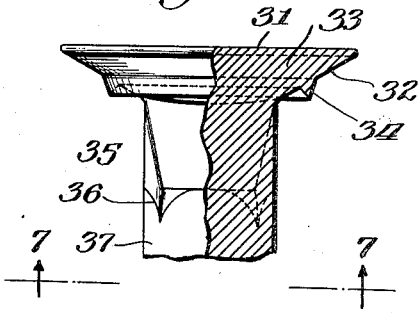
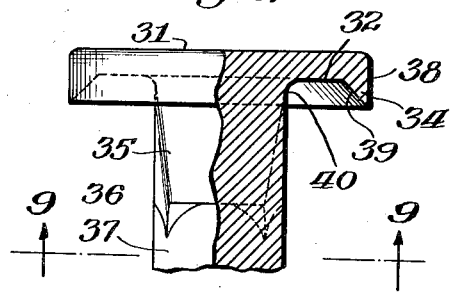
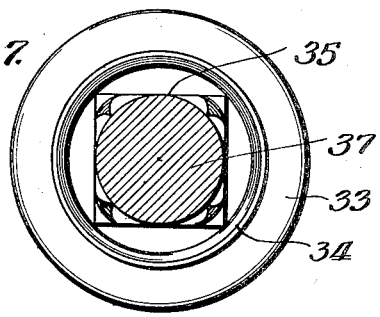
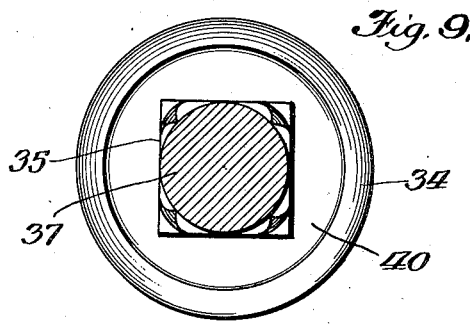
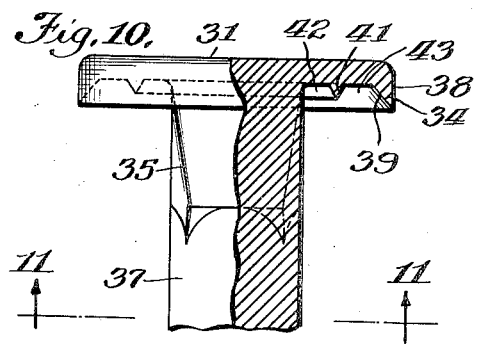
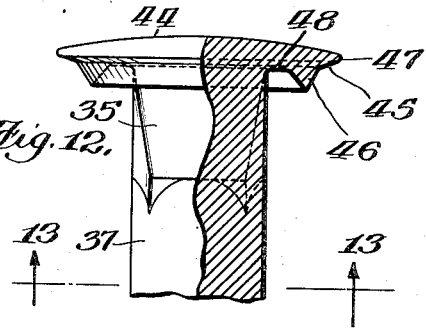
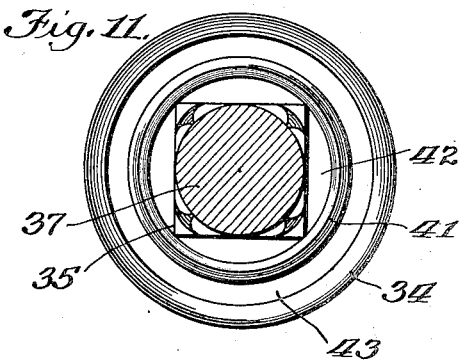
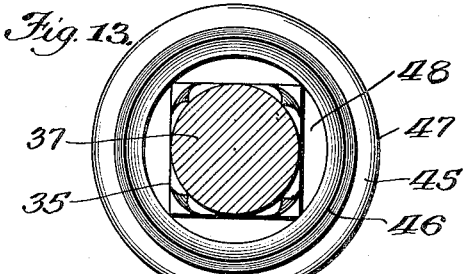

Patented Apr. 3, 1934

1,953,305

UNITED STATES PATENT OFFICE 1,953,305

BOLT

John A. MacLean, Chicago, Ill., assignor to MacLean-Fogg Lock Nut Company, Chicago, Ill., a corporation of Illinois Application August 1, 1930, Serial No. 472,249
Renewed February 6, 1933

2 Claims. (Cl. 85—9)

The present invention relates to bolts and is particularly concerned with improvements in bolts for use in railway freight and passenger, and industrial cars and the like.

While the present invention is of particular importance in connection with railway freight cars, it should be understood that the present bolt is capable of universal use and will be found advantageous wherever it is desirable to effect a waterproof or water-tight seal about the head of the bolt, or where it is desirable to utilize any of the other novel features of the bolt.

The railway freight cars of the prior art, which have their wooden sheathing secured by ordinary bolts, such as carriage bolts, are subject to the disadvantage that the wooden sheathing must be countersunk to receive the heads of the carriage bolts. In countersinking for the heads of the bolts, the edges around the countersunk holes are nearly always ragged and splintered. These ragged and splintered edges are the cause of loss and damage to lading contained in sacks, such as flour, sugar, cement, etc. It is, therefore, a desideratum in freight cars, that all fastening devices for sheathing, floors and any other portion of cars where bolts extend from inside to outside of car, they be installed with the heads flush with the surface of the wood. It also should be borne in mind that countersinking of the wood cuts a great deal of it away, thus materially decreasing its strength.

Another disadvantage of the prior art bolts is that water leaks in past the heads of the bolts so that the lumber soon begins to rot beneath the bolt head. The sheathing becomes loose, holes are formed in the sides and floors of the car, permitting leakage of the cargo such as grain, etc. The water which leaks past the bolt heads often causes damage to the cargo.

One of the objects of the invention is the provision of an improved car construction including water-tight fastening devices for sheathing, flooring, roofing and other portions of cars where bolts extend from inside to outside, for the purpose of eliminating looseness and rotting of the lumber about the bolts.

Another object is the provision of an improved bolt having a head adapted to be drawn into sealing engagement with the lumber, so as to eliminate the difficulties brought about by leakage of water past the head of the bolt.

Another object is the provision of a bolt of the class described, in which the head is adapted to be drawn substantially flush with the wood surface, thus eliminating the operation of countersinking, which is necessary with carriage and other types of sheathing or flooring bolts, and to aid in effecting a water-proof seal about the head of the bolt.

Another object is the provision of a bolt for use in coal mine pit and conveying cars and the like. Cars of this class are fastened with carriage bolts, the heads of which project inside of the cars. In dumping the load, a great deal of coal is crushed and broken up by these carriage head bolts. This degrades the coal. With the use of the improved bolt, the inside surfaces of the cars would be smooth, thus eliminating breakage and degrading.

Another object of the invention is the provision of an improved wood bolt having a head which is provided with integral formations adapted to confine and compress the wood about the bolt underneath the head, in order to form a substantially perfect water seal, as distinguished from the bolts of the prior art, the effect of which is to force the wood away from the bolt and head as the bolt is drawn into the wood.

A further object of the invention is the provision of an improved wood bolt provided with a head having portions adapted to be drawn into the wood to form a fluid tight seal, and also to prevent the bolt from turning.

A further object of the invention is the provision of an improved wood bolt provided with a head having staggered portions adapted to be drawn tightly into the wood to form a fluid tight seal, and also to prevent the bolt from turning.

Other objects and advantages of the invention will be apparent from the following description and from the accompanying drawings in which similar characters of reference indicate similar parts throughout the several views.

Referring to the two sheets of the drawings, Fig. 1 is a sectional view taken through a part of the railway car, showing wooden flooring or sheathing secured with a bolt constructed according to the present invention.

Fig. 2 is a sectional view of the bolt alone taken on the plane of the line 2—2 of Fig. 1.

Fig. 3 is a fragmentary sectional view of the bolt shown in Fig. 1, the view being taken on the line 3—3 of Fig. 2.

Fig. 4 is a fragmentary side elevational view of a modified form of bolt being broken into cross section generally along its center line.

Fig. 5 is a bottom plan sectional view of the head of the bolt shown in Fig. 4 taken generally on the lines 5—5 of Fig. 4.

Fig. 6 is a side elevational view in partial section of a modified form of bolt having a head with a flat top.

Fig. 7 is a bottom view of the head of Fig. 6 with the bolt in section on the plane of the line 7—7.

Fig. 8 is an elevational view in partial section of another modified form in which the wood engaging ridge is located at the extreme outer edge of the bolt head.

Fig. 9 is a sectional view taken on the plane of the line 9—9 of Fig. 8 showing the bottom of the head of this modified construction.

Fig. 10 is a side elevational view in partial section of a modification similar to Fig. 8, but having a plurality of ridges.

Fig. 11 is a sectional view taken on the plane of the line 11—11 of Fig. 10, showing the bottom of a head of this type.

Fig. 12 is an elevational view of another modified form of bolt in partial section having a convex head; and Fig. 13 is a sectional view taken on the plane of the line 13—13 of Fig. 12, showing the bottom of a head of this type.

Referring to Fig. 1, this figure shows an installation which is exemplary of one of the many forms in which the invention may be utilized, the floor or sheathing 10 being secured in place by a plurality of bolts 11 which pass through metal sills, braces or framework 12. The present bolts may be used with any kind of lumber, but where a tight construction is desired, some form of tongue and groove lumber is usually employed.

The metal supporting member 12 is provided with a bore 13 of sufficient size to receive the bolt 11, and the lumber may be bored with ordinary cylindrical holes 14 of the same size, or preferably slightly smaller than the bolt 11. Any form of nut 15 or other threaded member may be employed which is capable of cooperating with the complementary threaded portion 16 formed on the bolt 11, and it should be understood that if desired, the threaded bore may be formed in the bolt and the nut provided with a metal threaded portion. The bolt 11 preferably includes a head 17, a cylindrical body portion 18, and the threaded portion 16. The head 17 is preferably circular in shape and tapered in thickness from the body of the bolt out toward the outer edge 19 of the head. Thus, the lower surface 20 of the head slopes slightly upwardly away from the body 18.

The top surface 21 of the head is preferably but not necessarily convexly curved, the curvature being slight in order to prevent the formation of projections on the surface of the lumber, but the curvature is sufficient to give sufficient body to the head for the necessary strength. It should be understood, however, that the shape of the upper surface of the head may be changed while still utilizing the other features of the present invention, or the head may be made entirely flat at the surface 21 if desired. The lower surface 20 of the head is preferably provided with a plurality of integral arcuate ridges or camming formations 22, the ridges being preferably of the cross sectional shape shown in Fig. 1, but these ridges may be made V-shaped, oval or any other shape which is capable of accomplishing the purposes herein set forth, and the exact formation of the ridges and grooves herein illustrated is to be regarded as exemplary of a few of the many forms which these parts may take.

As will be most apparent in Fig. 2, the ridges 22 are shown in a staggered relation so that they may overlap each other. In the drawings four of these ridges have been shown, two adjacent the bolt and two beyond these which extend slightly beyond the ends of the first two ridges. It will of course be obvious that any number of ridges may be provided, and they may be staggered in any desired relationship, the principal objective of staggering the ridges being that the ends of adjacent ridges overlap. The apex 23 of the ridges 22 defines segments of a circle, the center of which preferably lies in the axis of the bolt, and the inner ridges 22 are preferably spaced sufficiently from the body of the bolt to effect a sealing engagement with the lumber 10 at a point spaced from the bore 14. These ridges 22 form one of the sealing surfaces which make the head of the bolt 11 water-tight, and the inner surfaces 24 of ridges 22 are also adapted to confine the adjacent parts of wood 10 and cam the wood inwardly against the body 18 of the bolt and upwardly into the grooves 25. It will be readily apparent that a particularly tight sealing engagement will be made between the wood and the ridges where adjacent ridges overlap at the points 25a.

It will also be apparent that after the bolt head has been impressed into the wood, turning of the bolt 18 will become very difficult, due to the interlocking relationship between the wood and the ends of the ridges 22.

As has already been mentioned, the grooves 25 located between the inner ridges 22 and the bolt form an additional water seat at this point. The bolt illustrated in Figs. 1 to 3 is provided with the aforementioned grooves 25 located adjacent the cylindrical body portion 18, but if desired, the bolt may be provided with a non-circular shoulder 26 immediately below the head, for the purpose of preventing rotation of the bolt in the bore 14 until the ridges 22 have cammed their way into the wood at which time the grooves will very effectively prevent rotation of the bolt.

In Figs. 4 and 5 a bolt 18 is shown generally similar to the bolt of Fig. 1, the difference being in the construction of the bottom face of the head 17. In the embodiment shown in Figs. 4 and 5, a spiral ridge 27 is provided in the underface 20 of the head 17. Extending from a point adjacent the bolt 18 to a point adjacent the external edge 19 of the head 17 as shown in the drawings, two complete spiral ridges have been formed in the lower face, and it will be readily apparent that one or more may be as easily provided. However, with the two complete spirals formed by the ridge 27, a double water-tight seal is provided for the bolt 18, and in addition thereto, it will be apparent that after the ridge 27 has been cammed or pressed into the wood 10, the bolt is securely locked against rotation. Thus it will be apparent that the ridge 27 performs a double function in preventing water or other fluids from reaching the bolt 18 and in positively locking the bolt against rotation after it has been secured in position. The operation and installation of the present bolt is as follows:

The lumber 10 is preferably provided with a bore 14 slightly smaller than the body 18 of the bolt to provide a closed fit, and the bolt 11 may be driven into the bore as far as possible with a hammer or other driving tool. The nut 15 may then be placed upon the threaded portion 16 of the bolt, and the nut threaded home by means of a wrench or other tool, during which operation the bolt will be gradually drawn into the bore 14, the head imbedding itself into the surface of the lumber about the bore 14 until the head is substantially flush with the surface of the lumber. During this operation, the frictional engagement of the ridges 22 with the lumber, the non-circular shoulder 26 of the body of the bolt 18, and the tight fit of the bolt in bore 14 prevent rotation of the bolt. It is readily apparent, however, that with the construction shown the position of the ridges 22, or in Figures 4 and 5, the spiral ridge 27, the non-circular shoulder 26 may be eliminated from the bolt, and notwithstanding the bolt will be held positively against rotation even in a slightly larger bore than the bolt 18.

As the bolt 11 is drawn into the wood, the ridges 22 compress the fibers of lumber and confine a substantial portion of the lumber immediately adjacent the body underneath the head 17, forcing the wood into the grooves 25. The lumber underneath the head finally takes the shape of the lower face of the head as shown in Fig. 1, being compressed into sealing engagement with the lower face of the head in such manner that a substantially perfect waterproof seal is formed.

It should be noted that the nut 15 and thread 16 constitute a force multiplying device for effecting the sealing engagement between the head and the lumber as well as means for permanently securing these parts in sealing engagement, and any kind of nut including lock nuts or lock washers may be employed for this purpose.

Referring to Figs. 6 and 7, the head illustrated in these figures is a modification of those already described, which differs in the provision of a flat upper surface 31, and the provision of a lower surface 32 on the head body 33, which surface is of greater angularity than those previously described. The angular surface 32 is also provided with an integral annular ridge 34 for engaging the wood fibers about the bolt, and preventing the leakage of water past the head of the bolt. The surface 32 is made of greater angularity in order to give the head body 33 the necessary thickness and still maintain the top 31 flat so that the present bolt can be drawn perfectly flush with the surface of the wood. The bolt is provided with a non-circular shank 35 which tapers at 36 to the round body 37 of the bolt.

Referring to Figs. 8 and 9, this modified form is provided with a flat top 31 which may be of substantially uniform thickness, being provided with a relatively flat lower surface 32. The annular ridge 34 of this type of head is located at the extreme outer edge of the head, the ridge 34 being provided with a substantially vertical outer surface 38, and with the substantially frustral conical inner surface 39 forming relatively large groove 40 between the body 37 of the bolt and the ridge 34 for confining and compressing the wood fibers.

Referring to Figs. 10 and 11 this modification is similar to Figs. 8 and 9 with the exception that a plurality of integral annular ridges are provided and the lower flat part 32 of the head is thus provided with an additional annular ridge 41. The ridge 41 divides the lower part of the head into two grooves 42, 43, and provides an additional sealing surface for preventing the leakage of water past the head of the bolt.

Referring to Figs. 12 and 13, this modification is provided with a head having an upper convex surface 44 and a lower convex surface 45. The lower convex surface is formed with the annular ridge 46 which is located intermediate the outer edge 47 of the head and the body 37 of the bolt. The present type of bolt is thus provided with a form of groove 48 between the ridge 46 and the body 37 for receiving and compressing the wood fibers, and this type of bolt may also be drawn substantially flush with the surface of the wood.

It will thus be observed that I have invented an improved bolt, which has peculiar advantages when used in connection with refrigerator and the wood portions of all railway freight cars, for the reason that it is highly desirable to avoid leakage of water past the bolt heads to the interiors of such cars. The present bolts effect a substantial improvement in the life and serviceability of cars which are equipped with such bolts, and the bolts are adapted to prevent leakage and enable the lumber to give good service for a much longer period of time than the devices of the prior art. When the present bolts are employed with wood, the projecting ridges under the heads of the bolts provide a perfectly waterproof seal, which prevents water from leaking into the interiors of the cars, damaging the cargo and rotting the lumber.

It will also be observed that with the use of the present bolts lock nuts are not absolutely essential, as ordinary nuts will imbed the head of the bolt into the wood so that the bolt is positively prevented from rotating, and thus the bolts of the present invention are adapted to perform the double function of locking the bolt into position after it has been placed there, and also performing a water-tight seal around the bolt.

It is of the utmost importance that the insulation of refrigerator cars be kept dry in order to maintain the insulating value, and particularly on account of the fact that the insulation is enclosed between the walls of the car where it will not dry out very quickly should it ever become wet.

While I have illustrated preferred embodiments of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a water tight bolt for securing a wooden member, a metal member having a head adapted to be drawn substantially flush with the surface of said wood, said head being embedded in said wood, said head having a substantially plane upper surface and a relatively thin annular body provided with a downwardly projecting flange at its outer border, said flange being provided with a frusto-conical camming surface adapted to cam the wood beneath said head when said head is embedded in said wood, an auxiliary water sealing ridge carried by the under side of said head between said flange and the body of said bolt, said auxiliary ridge being of less depth than said flange.

2. In a water-tight bolt for securing a wooden member, a metal member having a substantially cylindrical shank and a head, and said head having a plane upper surface, all parts of which are adapted to be drawn substantially flush with the surface of said wood, and a downwardly extending annular V-shaped ridge carried by said head and adapted to effect a water tight joint between said head and the adjacent wood, and a downwardly projecting border ridge of greater depth than the first-mentioned ridge, carried by said head and having a camming flange adapted to cam the wood into the range of operation of said first-mentioned ridge.

JOHN A. MacLEAN.